United States Patent [19]

Gorman et al.

[11] Patent Number: 4,807,890
[45] Date of Patent: Feb. 28, 1989

[54] SEALING COMBINATION

[75] Inventors: Gerald W. Gorman, Cedar Hill; Everett E. Johnston, Newark, both of Tex.

[73] Assignee: Esco Elevators, Inc., Fort Worth, Tex.

[21] Appl. No.: 30,121

[22] Filed: Mar. 26, 1987

Related U.S. Application Data

[63] Continuation-in-part of Ser. No. 787,100, Oct. 15, 1985, abandoned.

[51] Int. Cl.$^4$ ............................................. F16J 15/18
[52] U.S. Cl. .................................... 277/12; 92/168; 187/1 R; 277/64; 277/105; 277/125; 277/187; 277/205; 277/222
[58] Field of Search ............... 187/1 R, 12; 277/125, 277/124, 123, 102, 216, 187, 121, 188 R, 188 A, 205, 206 R, 152, 12, 58, 64, 222, 105, 60; 92/168

[56] References Cited

U.S. PATENT DOCUMENTS

| | | | |
|---|---|---|---|
| 534,575 | 2/1895 | Platts et al. | 277/125 X |
| 1,116,467 | 11/1914 | Myers | 277/216 |
| 1,528,771 | 3/1925 | Jackson | 277/216 |
| 2,877,071 | 3/1959 | Arnot | 277/216 |
| 3,120,394 | 2/1964 | Gould | 277/205 X |
| 3,169,776 | 2/1965 | Felt | 277/222 X |
| 3,351,350 | 11/1967 | Shepler | 277/188 R X |
| 3,554,569 | 1/1971 | Gorman | 277/205 |
| 3,586,341 | 6/1971 | Whittaker et al. | 277/124 |
| 3,599,490 | 8/1971 | Love et al. | 277/205 X |
| 3,655,204 | 4/1972 | Sievenpiper | 277/205 X |
| 3,765,690 | 10/1973 | Sievenpiper | 277/121 |
| 3,866,923 | 2/1975 | Gorman | 277/206 R X |
| 4,053,163 | 10/1977 | Vegella | 277/124 |
| 4,060,023 | 11/1977 | Vesella | 277/205 X |
| 4,082,300 | 4/1978 | Harbeck et al. | 277/123 |
| 4,169,604 | 10/1979 | Heathcott | 277/125 |
| 4,398,731 | 8/1983 | Gorman et al. | 277/124 |
| 4,473,231 | 9/1984 | Tilton et al. | 277/124 |
| 4,475,712 | 10/1984 | De Jaser | 277/124 X |
| 4,476,772 | 10/1984 | Gorman et al. | 277/205 X |
| 4,512,586 | 4/1985 | Smith | 277/105 X |

FOREIGN PATENT DOCUMENTS 651038 2/1929 France ......................... 277/126

*Primary Examiner*—Allan N. Shoap
*Attorney, Agent, or Firm*—James C. Fails; Arthur F. Zobal; Geoffrey A. Mantooth

[57] ABSTRACT

An improvement in a sealing combination between a head of a hydraulic cylinder and a plastic covered cable traversing therethrough, including the plastic covered cable connected with a piston interiorly of the cylinder so as to be moved longitudinally responsive to hydraulic pressure applied to the piston traversing interiorly of the cylinder, a gland disposed about and sealingly encompassing the plastic covered cable, a head defining an annular packing box about the plastic covered cable and adapted to receive the gland for holding a seal in place and a wiper ring disposed in the gland and about the plastic covered cable for wiping dirt and the like therefrom before the cable enters the sealing combination; characterized by a split ring of resilient material emplaced in the bottom of the packing box and encompassing the plastic covered cable without sealing engagement therewith; a split backup compression ring of thermoplastic material disposed in the packing box so as to be responsive to the compressive force of the split ring and encompassing the plastic covered cable; and at least one compressed, split pressure balanced seal resilient material disposed in the top of the packing box. The spacer ring has sufficient compressive force to effect sealing with even a single seal even though the seal is split. Specific preferred structures are disclosed for the respective embodiments.

16 Claims, 5 Drawing Sheets

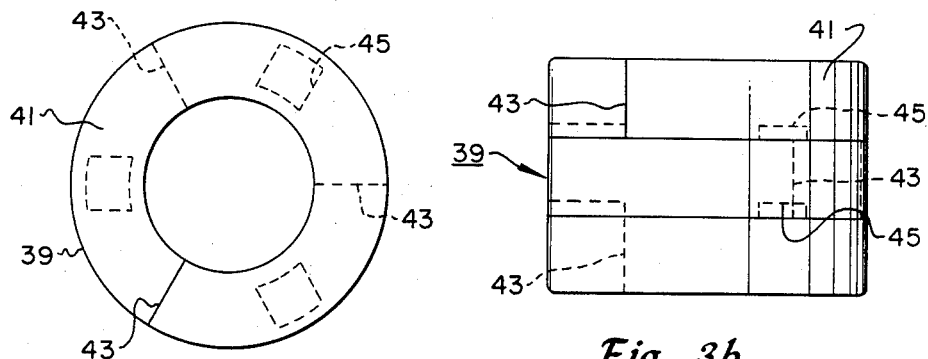
Fig. 3a
prior art
Fig. 3b
prior art
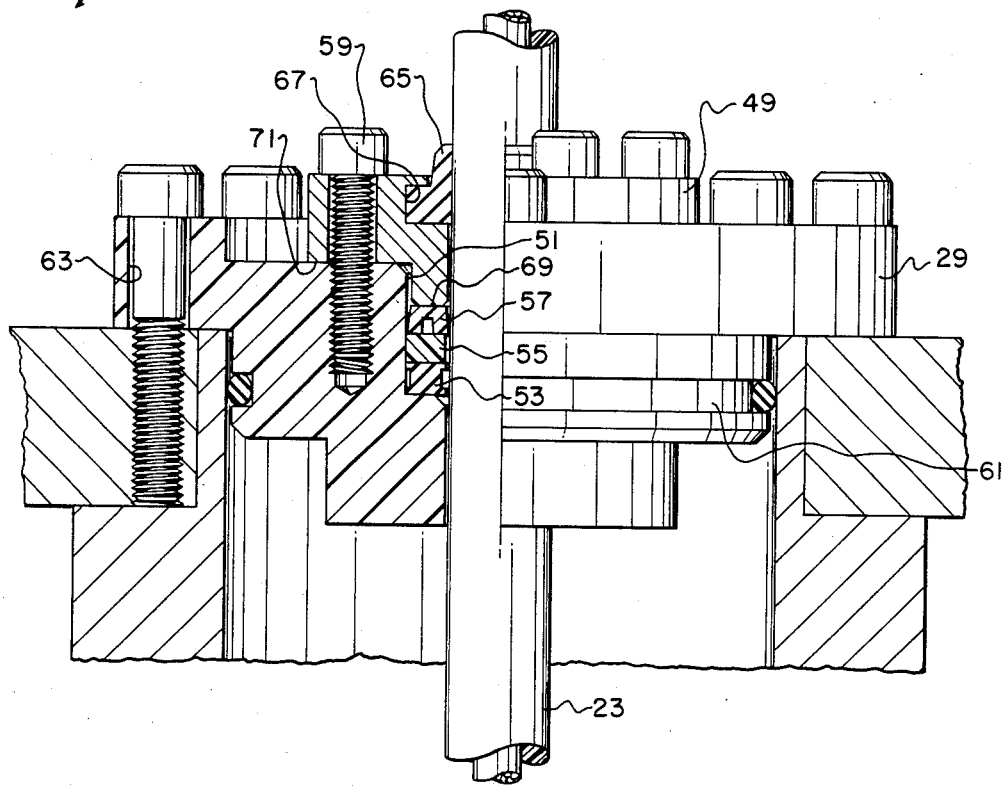
Fig. 3c

SEALING COMBINATION

CROSS REFERENCES TO RELATED APPLICATIONS

This invention is a continuation-in-part application of application Ser. No. 06/787,100, filed Oct. 15, 1985, now abandoned, same inventor, same title and assigned to the same assignee.

FIELD OF THE INVENTION

This invention relates to sealing combinations. More particularly this invention relates to a sealing combination for sealing between the head of a hydraulic cylinder and a plastic covered cable running therethrough; such as, might be employed in a hydraulic elevator cable seal.

BACKGROUND OF THE INVENTION

The prior art has seen a wide variety of different types of seals for sealing between a rod and head of a hydraulic cylinder through which it traverses. There have been many fewer sealing combinations developed, however, for sealing between a cable, even a plastic covered cable, traversing through the seal and the head of a hydraulic cylinder through which it traverses.

One of the approaches of the prior art has been the use of a plurality of compression seals in the form of an endless packing material that is wrapped around the cable, or a plurality of rings that can be split and then joined about the cable with their ends split in an offset pattern arrangement. Where the offset pattern arrangement of split ends is employed, there is usually employed a dam or the like intermediate the split ends to prevent liquids from flowing from one split end to another split end. The inventors do not know of another sealing arrangement in which a single split seal is employed as in the preferred embodiment of this invention.

In my U.S. Pat. No. 3,866,923, I disclosed a sealing rod wiper that was capable of alleviating problems due to intake of dust, water and the like and that invention is useful in this invention. Despite this improvement there continues to be problems with leakage of seals. In my U.S. Pat. No. 3,554,569, I described a dynamic pressure balanced seal that had very little leakage and that seal has proven useful in this invention. In my U.S. Pat. No. 4,476,772, I described an improved caging seal for hydraulic elevators or the like that resisted crushing of the seals. That approach proved satisfactory for elevator push rods that pushed the elevator upwardly and downwardly. It was not totally satisfactory, however, for a hydraulic seal in which cables traversed through the head of the cylinder, instead of having a steel rod or the like, it had a smooth external surface traversing through the head of the hydraulic cylinder.

From the foregoing it can be seen that the prior art has not provided an economical sealing combination that can be employed to seal intermediate a plastic covered cable and a head on a hydraulic cylinder encompassing a piston in in which the seal could be made to work with only a single split seal; thereby alleviating the deficiencies of the prior art and the necessity for using a plurality of sealing rings with dams intermediate splitting ends.

SUMMARY OF THE INVENTION

Accordingly, it is an object of this invention to provide an economical sealing combination that is effective in sealing about a cable traversing through a head on a hydraulic cylinder, alleviating the deficiencies of the prior art.

It is a specific object of this invention to provide an economical sealing combination that satisfies the foregoing object, achieves the seal with a single split ring seal for initial economy and is exceptionally low trouble in maintenance.

These and other objects will become apparent from the descriptive matter, hereinafter, particularly when taken in conjunction with the appended drawings.

In accordance with this invention, there is provided a sealing combination for sealing intermediate a head of a hydraulic cylinder and a plastic covered cable that is difficultly disconnectable and reconnectable at either end and traversing therethrough and including the plastic covered cable connected with a piston interiorly of the cylinder so as to be moved longitudinally responsive to hydraulic pressure applied to the piston traversing interiorly of the cylinder; a gland disposed about and sealingly encompassing the plastic covered cable; a head defining an annular packing box about the plastic covered cable and adapted to receive the gland for holding the seal in place; and a wiper ring disposed in the gland and about the plastic covered cable for wiping dirt and the like therefrom before the cable enteres the sealing combination. The improvement in the sealing combination is characterized by split ring of resilient material emplaced in the bottom of the packing box and encompassing the plastic covered cable without sealing engagement therewith, the split ring having a compressive force when pushed against; a split backup compression ring of thermoplastic material disposed in the packing box so as to be responsive to the compressive force of the split ring and encompassing the plastic covered cable; and at least one split pressure balanced seal of resilient material disposed in the top of the packing box so as to be responsive to the compressive force of the split ring transmitted by the backup compression ring such that the gland can be inserted within the packing box to press the pressure balanced seal against the backup compression rings with sufficient force to effect sealing with even a single seal even though the seal is split. Also disclosed are specific materials of construction for the respective elements and a respective critical internal interference and critical angle of cut with critical movement in compression of the preferred materials of construction to effect the seal with the single pressure balanced seal.

BRIEF DESCRIPTION OF THE DRAWINGS

FIG. 3a is a top view of a typical prior art arrangement of seals showing the staggered relationships of the joints with respective isolation dams intermediate the respective joints.

FIG. 3b is a side elevational view of the prior art of FIG. 3a.

FIG. 3c is a side elevational view, partly in section, of the seal in accordance with this invention and embodying only a split seal.

DESCRIPTION OF PREFERRED EMBODIMENT(S)

This invention may be useful in more than one application. It was developed, however, with regard to hydraulic elevator seals and it is in this environment that it will be described herein.

Figure 1:
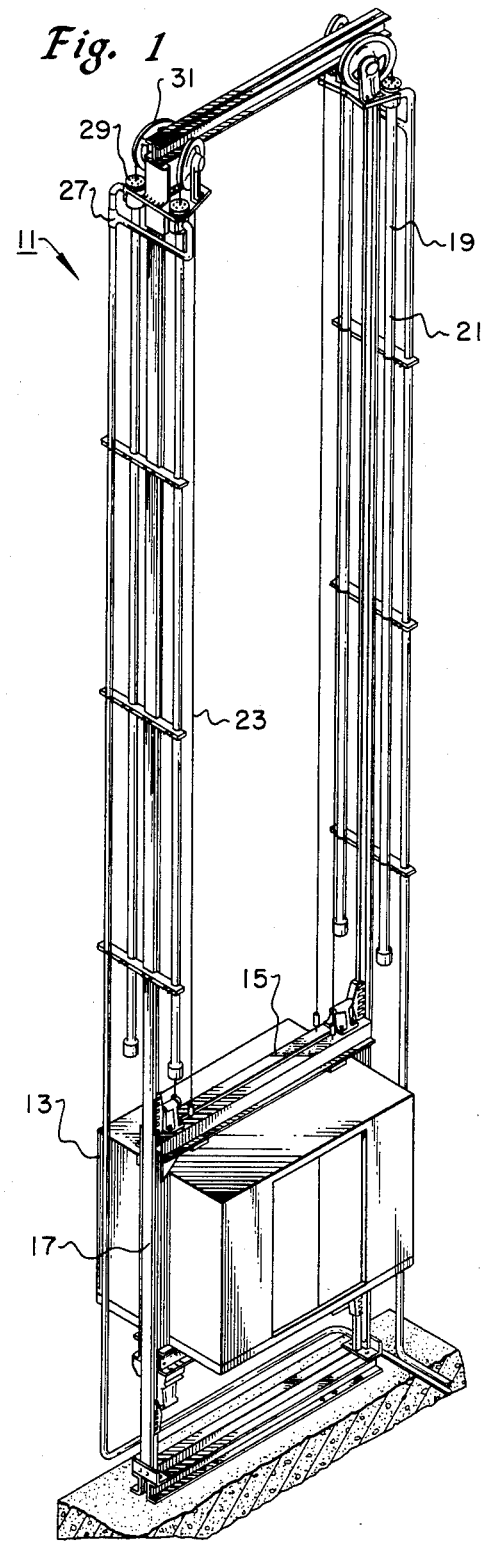
FIG. 1 is an isometric view showing one embodiment of this invention employed in a context of a hydraulic elevator cable seal.
Figure 2:
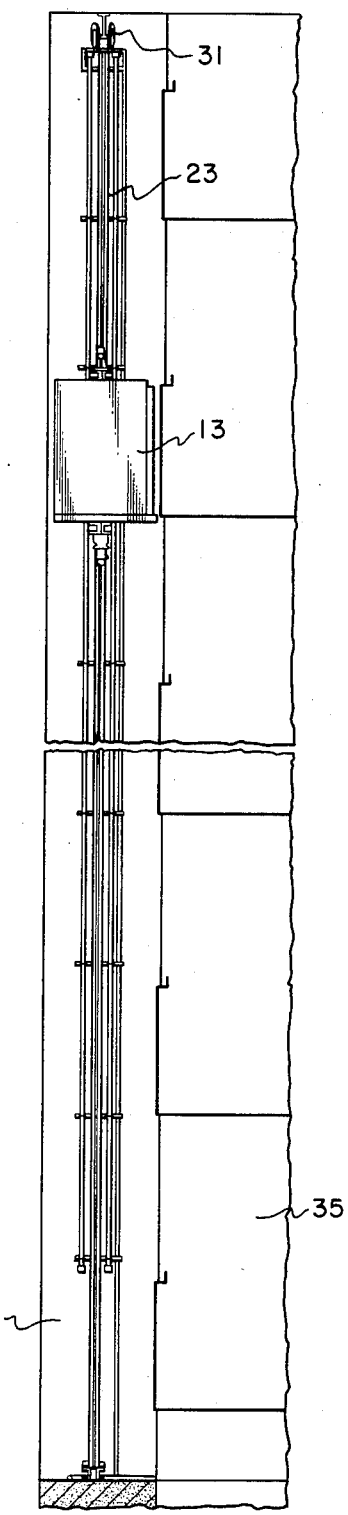
FIG. 2 is a side elevational view of the embodiment of FIG. 1 with the elevator having been lifted by downward movement of the pistons in the respective cylinder of FIG. 1.
Figure 4:
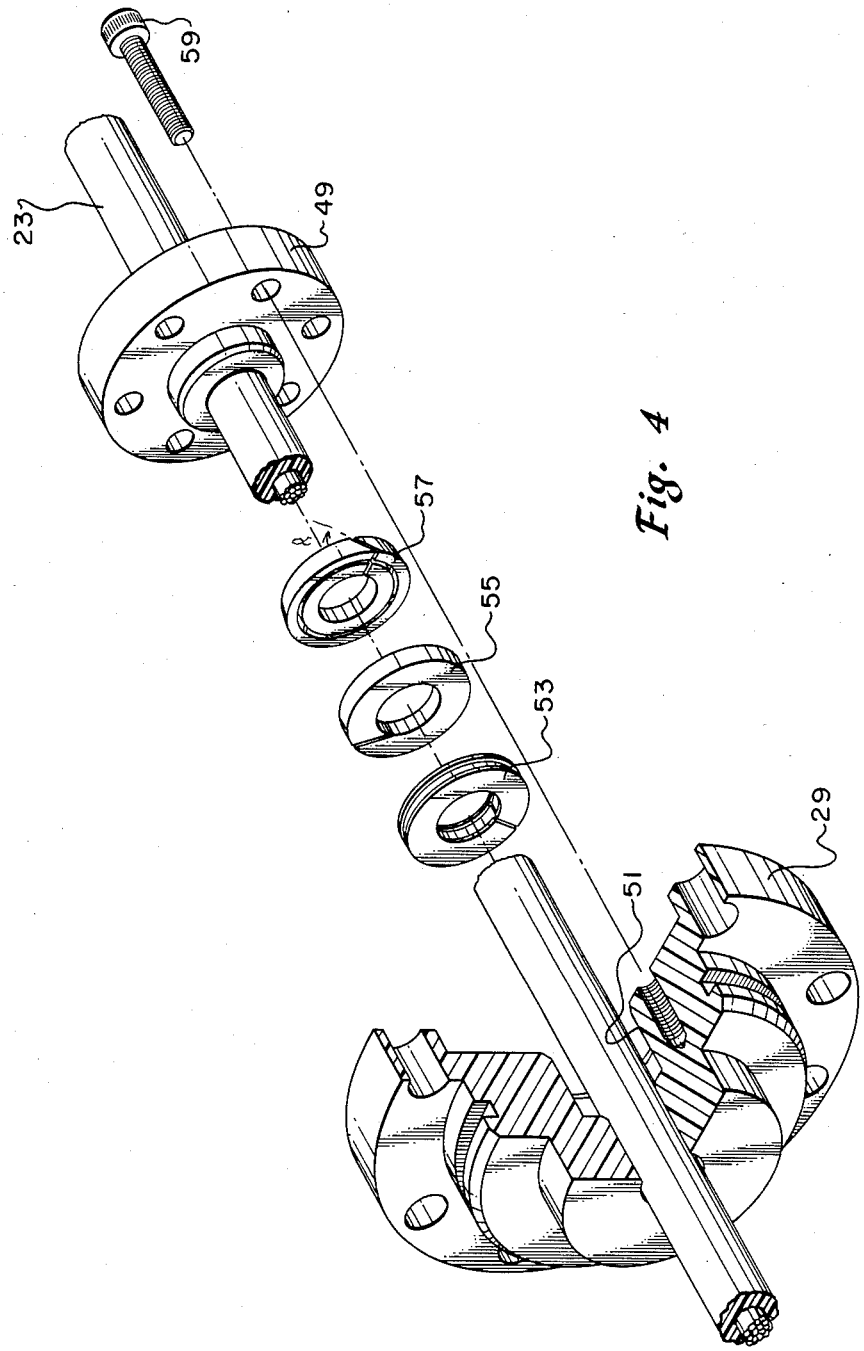
FIG. 4 is an exploded partial isometric view, partly cut away illustrating the embodiment of FIG. 3c.

Referring to FIGS. 1 and 2 for an overview of that environment, the cable type elevator 11 includes a car 13 suspended from a structurally strong sling 15 that traverses upwardly and downwardly along rail structure 17 on each side. The upwardly and downwardly traversing of the car 13 is effected by a hydraulic piston assembly 19 interiorly of a hydraulic cylinder assembly 21, the hydraulic piston not being shown in detail. The car 13 suspended from its sling 15 is moved upwardly and downwardly responsive to movement of cables 23 that are connected at their other end with the hydraulic piston assembly 19 interiorly of the hydraulic cylinder assembly 21 so as to move responsive to hydraulic pressure properly applied. As can be seen by the hydraulic conduits 27, the hydraulic pressure may be applied to the top side of the piston to move it downwardly and rely on gravity to move the car downwardly when hydraulic pressure is released if such an arrangement is desired. The hydraulic fluid supplied by the conduit 27 is controlled by the usual conventional controls responsive to a high pressure hydraulic pump and the like (not shown).

Important to the feature of this invention is the effecting of a seal intermediate the head 29 of the hydraulic cylinder assembly and the respective plastic-covered cable 23 passing therethrough responsive to movement of the hydraulic piston assembly 19. Specifically, the cable 23 is covered with a plastic cover and traverses over the respective sheave assembly 31 so that its end moves concurrently with the hydraulic piston assembly interiorly of the hydraulic cylinder assembly 21.

Heretofore attempts to seal around a cable or the like have not been very effective and have required a plurality of rings of sealing material to form even the imperfect seals.

Of course, the car 13 is provided for the purpose of traversing intermediate multiple floors such as illustrated in FIG. 2 and suitable openings are provided for the hoistway 33 in which the car 13 travels to the rest of the respective floors such as 35.

In accordance with the improvement of this invention, there is provided an economical seal for sealing around the plastic covered cable in an innovative way that has not been done heretofore and allows sealing with only a single seal. To help understand the advantages of this invention it may advantageous to consider the prior art approaches such as illustrated in FIGS. 3a and 3b. Therein, the seal 39 comprise a plurality of split rings 41 as illustrated in the dash lines 43, FIG. 3a. As shown by the cut 43, shown in dash lines in 3a and in both regular and dash lines in FIG. 3b, the cuts are offset; for example, about 120° where there are 3 rings 41. In addition, to prevent fluid leaking from one cut along the joint between the rings 41 to the next cut, dams illustrated by dash lines 45, are interposed intermediate the cuts to prevent fluid migration. The dams are sealingly carried, for example, by the top of a lower ring and seal against the bottom of an upper ring. Such a construction employed exceptional care in the installation to be sure that the dams 45 sealed properly and that the cuts 43 were properly placed. Another approach was simply to wrap strings of packing and compress them hoping that they would seal. This almost always failed to prevent leakage of a fluid that would seep along the strands of packing material.

In contrast, one embodiment in accordance with this invention is illustrated in FIG. 3c. Therein the plastic covered cable 23 traverses interiorly of a head 29. The head 29 has an adjustment gland 49 for compressing the sealing combination interiorly of a packing box 51. The gland 49 is provided for adjustment and is sometimes referred to as a cap ring.

The sealing combination in a packing gland includes a split ring 53 of resilient material placed in the bottom of the packing box and encompassing the plastic covered cable 23 without sealing engagement therewith; a split spacer ring 55 of thermoplastic disposed in the packing box so as to be responsive to the compressive force of the split ring 53; and at least one split pressure balanced seal 57 disposed in the top of the packing box so as to be responsive to the compressive force of the split ring transmitted by the spacer ring when the gland 49 is moved into position to compress the sealing combination, as by stud bolts 59 being screwed into their mating threaded receptacles in the head.

It is believed helpful at this point to consider the respective elements individually.

The plastic covered cable 23 is a conventional elevator cable that has been covered with plastic to improve the sealability of its exterior surface and prevent leaking of hydraulic oil from the hydraulic cylinder assemblies 21 as the cable moves through the head and gland. The covering with the plastic is an attempt to produce as smooth an external surface on the cable as possible and to resist migration of the hydraulic fluid through the interstices formed interiorly of the cable itself. The sheath of plastic is continuous and encompasses the cable throughout its length that will traverse interiorly of the hydraulic cylinder assembly 21, preferably along its total length.

The cylinder assembly 21 comprises the usual conventional cylinder assembly for hydraulic elevators such as steel cylinder connected by suitable hydraulic conduit from suitable valves and controls with high pressure hydraulic pumps, reservoirs and the like in a conventional setup. The cylinder assembly has its head 29 with its gland sealingly connected therewith for sealing engagement with the plastic covered cable.

The head 29 is comprised of a suitably strong structure that has a groove 61 for receiving an O-ring or other sealing apparatus to be placed contiguous the wall of the sealing cylinder assembly 21 when the head is screwed into place as by studs through apertures 63. Typically, the hydraulic cylinder will have a flange that will have mating threaded apertures for receiving the studs through aperture 63 and will sealingly engage the lower portion of the head 29 for preventing leaking of the hydraulic fluid, similarly as described with U.S. Pat. No. 4,476,772, the contents of which are incorporated herein by reference for details that are omitted herefrom.

The head 29 is preferably formed of a metal, such as steel. It receives the gland 49.

The gland 49 is a conventional gland having suitable stiffness, such as being formed of metal, such that it can be screwed downwardly into tight compressive engagement with a sealing combination, as by screwing of stud bolts 59 into suitable threaded receptacles in the head 29.

The cap ring includes a conventional mud wiper ring 65. The mud wiper 65 is similar to the wiper ring disclosed in my aforementioned U.S. Pat. No. 3,866,923 to alleviate problems with the intake of dust, or other foreign ingredients that would tend to ruin the seal effected by the sealing combination as the plastic covered cable 23 traverses interiorly thereof. In the specific embodiments that we have employed, we have used a solid mud ring 65 formed of the usual materials of construction described in the aforementioned patent. If desired a split wiper ring 65 can be inserted into its groove 67 interiorly of the gland even with the cable 23 in place. This is practical because the sealing combination in the packing box 51 prevents the necessity of having to seal against high pressure hydraulic fluid by the wiper ring 65.

The car 13, the sling 15, the rail structure 17 are conventional and need not be described in detail herein. The hydraulic piston assembly interiorly of the hydraulic cylinder assembly 21 is relatively conventional except that it has a place for the cable 23 to fasten to the hydraulic piston to make the end move with the piston interiorly of the hydraulic cylinder assembly. This movement of the respective pistons effects movement of the plastic covered cable 23 over the respective sheave assemblies 31, so each cable moves reciprocally interiorly of its sealing combination in its packing box 51.

Each sheave assembly 31 is a conventional sheave assembly such as employed in the hydraulic elevator art and need not be described in detail herein. Similarly, the hoistway is conventional as are the respective floors and elevator openings on the respective floors.

Each packing box 51 comprises a conventional type annular space about an article to be sealed against. In this invention it is not a piston rod but is the plastic covered cable 23 and seal is effected at the radial interior of the head 29. As in accord with the usual practice, the packing box has relatively smooth cylindrical walls at its exterior for receiving the elements of the sealing combination.

As indicated hereinbefore, the respective elements of the sealing combination include at the bottom of the packing box, the split ring 53. The split ring 53 is formed of a relatively compressable material that has a compressive force when pushed against. As stated hereinbefore, it must not sealingly engage the plastic covered cable 23. It is, however, compressed against the outside wall of the packing box. We have found it is preferable to employ a ring that has relatively rectangular or square cross-sectional configuration so that it has essentially four corners to give predictable compressive force. It has been found preferable to employ Buna N Rubber having a durometer hardness of about 80 for best results. Other compressible materials can be employed as long as they are integrally designed with the rest of the sealing combination such as the backup compression ring.

The split spacer ring 55 is formed of a thermoplastic material and is split, as is the split ring of resilient material emplaced at the bottom of the packing box. The split spacer ring 55 is emplaced adjacent and contiguous the split ring at the bottom so that the compressive force can be transmitted. Preferably the spacer ring is split for being emplaced about the plastic covered cable 23 and interiorly of the packing box 51 with the cable 23 installed. Preferably, the split spacer ring is formed by machining the ring from machinable plastic such as Orlon, Nylon, Delrin densified polyethylene, or the like. It is imperative that the spacer ring be able to transmit the compressive force to the pressure balanced seal 57.

The pressure balanced seal 57 comprises at least one ring that is split for being installed in the packing box 51 and encompassing the plastic covered cable 23 while the plastic covered cable 23 is installed.

Where a plurality of pressure balanced seals are employed similarly as in the prior art, a lot of the criticality of construction that will be described hereinafter is not necessary. One of the particular advantages of this invention has been found to be, however, that only a single pressure balanced seal can be employed if certain critical aspects are observed.

For example, the interference with the plastic covered cable must be held very minute. If there is much interference fit there is a gap created at the split in the seal. It has been found that 0.005 inch (") maximum must be observed to prevent creation of a leaking gap in the split single pressure balanced seal when it is employed. The radial exterior of the pressure balanced seal has an interference fit with the wall of the packing box 51 for effecting a seal, particularly when compressed slightly, as by drawing downwardly of the gland 49. The conventional types of interference fits can be employed in this technology and having an exact interference fit of less than 0.005 inch (") is not critical as it is with the radial interior interference fit with the plastic covered cable 23. For example, an interference fit of 0.010 inch (") to 0.020 inch (") is tolerable at the radial exterior of the pressure balanced seal 57.

The split in the end of the pressure balanced seal must be such that it will effect sealing when compressed together. Specifically this means that the ends must have exactly the same cut so that their coengagement is a sealing coengagement under compressive force. In addition, it is important that the end of the seals be pressed together with sufficient compressive force. Consequently, the angle of cut of the seal, expressed as an angle alpha with respect to the plane perpendicular to the center line of the plastic covered cable and through one end of the cut, must be in the range of 5°–45°. Preferably the angle alpha is in the range of 20°–40° for maximum assured sealing capability. Apparently, the angled-cut seal 57 adapts to slight changes in diameter by sliding action under the compression from spacer ring 55 and maintains its seal.

Figure 5:
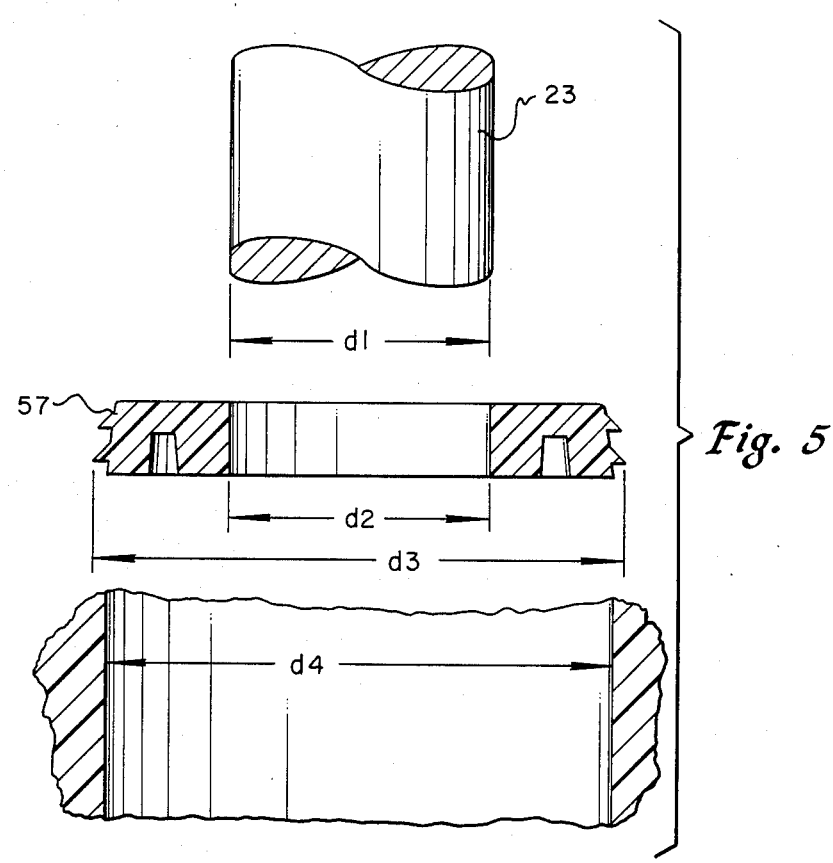
FIG. 5 is a partial cross-sectional view, partly cut away, showing the overlap to give the interference fits Δd1 and Δd2.
Figure 6:
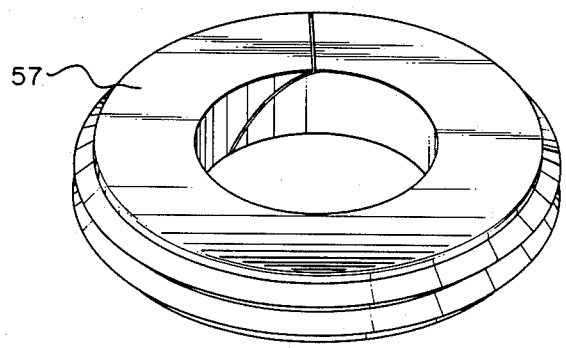
FIG. 6 is an isometric view of the split seal ring before installation.

As will be recognized, the so-called interference, or interference fit, represents an overlap between the exterior dimensions of a unit that is to be inserted within a space within a second unit. The interference fit is in effect the overlap of the radius of the two units. For example, referring to FIG. 5, the $\Delta d1$ is twice the radius overlap, or interference fit and is equal to $2 (\Delta r1)$. $\Delta d1$ equals ($=$) d1 minus ($-$) d2. Expressed otherwise, the interference fit is the differential radius difference which is limited to no more than 0.005 inch. Expressed otherwise, the differential diameter is limited to 0.010 inch for $\Delta d1$. On the other hand, the interference fit at the extremity can be thought of as $\Delta d2 = d3 - d4$; and it can have a diameteral difference of 0.040 inch; or $\Delta r2 = 0.020''$.

It is relatively difficult to determine exactly the dimensions because the cable shrinks under a load and the seal must be cut and emplaced within the gland cavity to seal about the cable. For example, it has been found that the outer dimensions of the cable may shrink as much as 0.003–0.005 inch under load. The following table reflects the dimensions of the cable and the seal and the cavity at rest.

TABLE $d1 = 0.600$ inch (outer diameter of nylon covered cable at rest, which diameter diminishes to 0.554 inch when the cable is stretched under load).

$d2 = 0.544$ inch (diameter of aperture in seal, giving an interference fit under load of 0.005 inch in terms of differential radius).

$d3 = 1.120$ inch (diameter of a seal at its extremities)

$d4 = 1.1$ inch (diameter of cavity into which seal is emplaced).

This allows a thickness of about $\frac{1}{4}$ inch for the seal and an interference fit of about 0.010 inch between the outer dimension of the seal and the inner dimension of the cavity into which it is emplaced. If desired, as noted hereinbefore, that interference may range to as large as 0.020.

As implied hereinbefore the gland 49 must be capable of being moved downwardly for a critical amount of compression when emplaced in the head 29 to sealingly hold the sealing combination in place. Specifically, when the preferred materials of construction set forth hereinbefore are employed for the split ring, the split spacer ring 55, and the single pressure balanced seal 57, it is imperative that about 0.030 inch ('') compressability be able to be introduced in tightening of the gland 49 by tightening the plurality of stud bolts 59. Expressed otherwise, when the bottom of the gland, illustrated by the numeral 69 in FIG. 3c touches the top of the pressure balanced seal 57, there should be 0.030'' clearance underneath the bottom 71 of the gland in its engagement with the head 29. This allows exactly the right amount of compression to effect sealing when the cut is in the range of about 20°–40° for alpha and the materials of construction are employed as described hereinbefore.

In operation, the head 29 and gland 49 are slipped over the plastic covered cable and the plastic covered cable connected at its respective ends with the sling 15 and the hydraulic piston assembly 19. The hydraulic piston assembly with the end of the cable is then placed interiorly the hydraulic cylinder assembly 21 and the head 29 is affixed in the conventional manner.

The respective sealing combination can be emplaced in the packing box as the cable is installed in the initial installation. Thereafter, the gland can be loosened and the elements of the sealing combination, including the split ring 53 at the bottom of the packing box, the split spacer ring 55, and the split pressure balanced seal 57 can be installed, or changed out as desired, without the necessity of having to loosen the difficultly loosenable ends of the cable. The rest of the installation then is relatively conventional and the plastic covered cable is free to move responsive to hydraulic fluid action against the hydraulic piston in the hydraulic piston assembly 19 interiorly of the hydraulic cylinder assembly 21. The wiper ring which either will be split or will have been emplaced interiorly of its groove 67 maintains the plastic covered cable relatively clean adjacent the respective sealing combination. Exceptionally long and trouble free service is possible with this combination. Even when maintenance is required, as such as replacing a pressure balanced seal or other ring, the configuration allows simply loosening the gland and removing the one or more split rings and installing of new suitably split rings and re-effecting seal.

Figure 7:
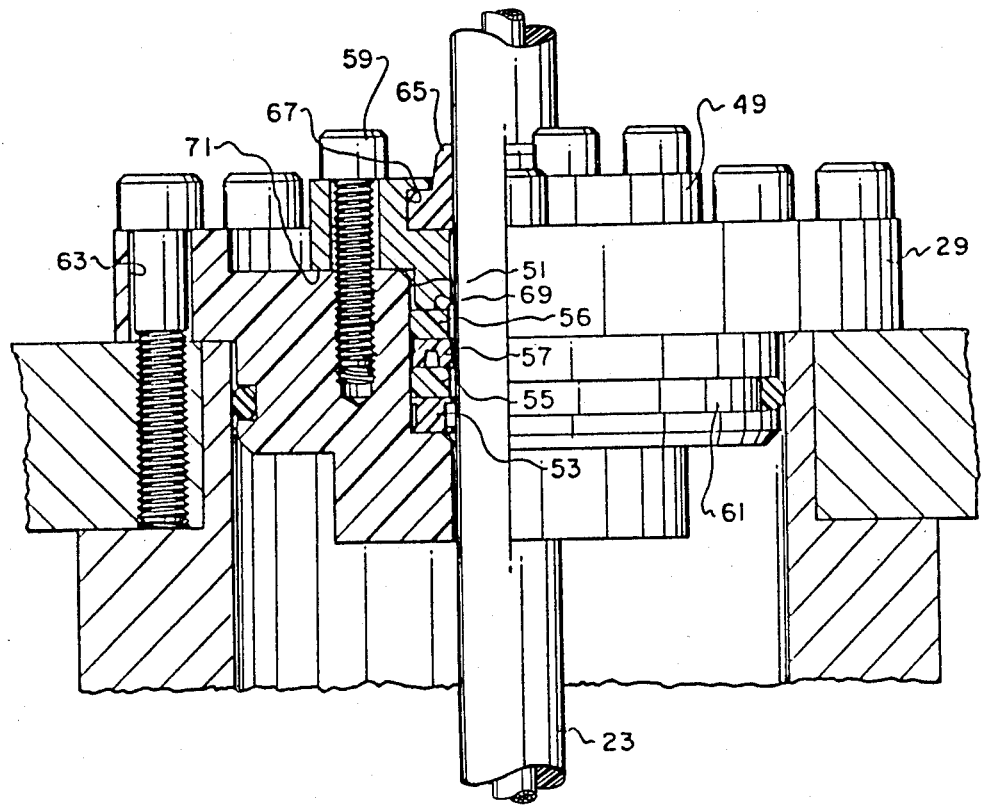
FIG. 7 is a partial cross-sectional view of another embodiment of this invention.

If desired, a split backup compression ring 56, FIG. 7, can be employed on top of the seal 57, or on the side of the seal 57 opposite the spacer ring 55. The split backup compression ring will be of the same design as the spacer ring and does not seal, per se.

From the foregoing it can be seen that this invention achieves the objects delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In a sealing combination for sealing intermediate ahead of a hydraulic cylinder and a plastic covered cable that is difficultly disconnectable and reconnectable at either end and traversing therethrough, including:

a. said plastic covered cable having a substantial cylindrical exterior of diameter d1 and being connected with a piston interiorly of the cylinder so as to be moved longitudinally responsive to hydraulic pressure applied to the piston traversing interiorly of the cylinder;

b. a gland disposed about and sealingly encompassing the plastic covered cable; said gland having a cavity of a diameter d4;

c. a head defining an annular packing box about the plastic covered cable and adapted to receive the gland for holding the seal in place; and d. a wiper ring disposed in said gland and about the plastic covered cable for wiping dirt and the like therefrom before the cable enters the sealing combination; the improvement comprising e. a split ring of resilient material emplaced in the bottom of said gland cavity and encompassing said plastic covered cable without sealing engagement therewith; said split ring having a compressive force when pushed against;

f. a split spacer ring of thermoplastic material disposed in the gland cavity and on top of said split ring of resilient material so as to be responsive to said compressive force of said split ring and encompassing the plastic covered cable;

g. only one split pressure balanced seal of resilient material disposed on the top of said split spacer ring and within said gland cavity so as to be responsive to said compressive force of said split ring transmitted by said spacer ring; said split pressure balanced seal having radially exterior circumferential projections of diameter d3 on an outer leg of the seal and a substantially cylindrical inner leg spaced from said outer leg by a bight portion, said inner leg defining an aperture of diameter d2 that is less than the substantially cylindrical exterior surface diameter d1 of the cable by an amount that is less than the amount the diameter d3 of said lips exceeds the diameter d4 of said gland cavity, all defined as said split pressure balanced seal having an interference fit that is sufficiently greater at its radial exterior with the wall of said packing than the interference fit at its radial interior with the plastic covered cable to prevent gapping and leaking of the formed joint defined by said pressure balanced seal such that the gland can be inserted within the gland cavity to press the pressure balanced seal against the spacer ring when a sufficient force to effect sealing with even a single seal even though said seal is split.

2. The improved sealing combination of claim 1 wherein said split ring is formed of Buna-N (nitrite) Rubber having a durometer hardness of about eighty (80) with a substantially square cross-sectional shape.

3. The sealing combination of claim 1 wherein said spacer ring is formed of a material selected from the group consisting of Nylon and Delrin.

4. The sealing combination of claim 1 wherein said pressure balanced seal is formed of synthetic rubber.

5. The sealing combination of claim 1 wherein said split ring is formed of Buna-N (nitrite) Rubber having a durometer hardness of about eighty (80); said spacer ring is formed of a material selected from the group consisting of Nylon and Delrin; and said pressure balanced seal is formed of synthetic rubber.

6. The sealing combination of claim 1 wherein said split pressure balanced seal has no more than 0.005 inch (") interference fit with the plastic covered cable at its radial interior so as not to gap and leak; said split pressure balanced seal has an interference fit with the packing box at its radial exterior of less than 0.020 inch for sealing fit; and said pressure balanced seal has its ends where it is split cut in sealingly mating relationship at an angle alpha within the range of 5°-40° with respect to a plane perpendicular to the center line axis of said pressure balanced seal.

7. The sealing combination of claim 6 wherein said angle alpha is within the range of 20°-40° and said gland is moved 0.030 inch in compression of said sealing combination to effect sealing.

8. The sealing combination of claim 6 wherein said seal has a split backup compression ring disposed contiguous its top, on the side opposite said split spacer ring.

9. In a sealing combination for sealing intermediate a head of a hydraulic cylinder and a plastic covered cable that is difficulty disconnectable and reconnectable at either end and traversing therethrough, including:
   a. said plastic covered cable having a substantially cylindrical exterior of diameter d1 and being connected with a piston interiorly of the cylinder so as to be moved longitudinally responsive to hydraulic pressure applied to the piston traversing interiorly of the cylinder;
   b. a gland disposed about and sealingly encompassing the plastic covered cable; said gland having a cavity of diameter d4;
   c. a head defining an annular packing box about the plastic covered cable and adapted to receive the gland for holding a seal in place; and
   d. a wiper ring disposed in said gland about the plastic covered cable for wiping dirt and the like therefrom before the cable enters the sealing combination; the improvement comprising:
   e. split ring of resilient material emplaced in the bottom of said gland cavity and encompassing said plastic covered cable without sealing engagement therewith; said split ring having a compressive force when pushed against;
   f. a split spacer ring of thermoplastic material disposed in the gland cavity and on top of said split ring of resilient material so as to be responsive to said compressive force of said split ring and encompassing the plastic covered cable;
   g. at least one split pressure balanced seal of resilient material disposed on the top of said split spacer ring and within said gland cavity so as to be responsive to said compressive force of said split ring transmitted by said spacer ring; each said split pressure balanced seal having radially exterior circumferential projections of diameter d3 inner leg spaced from said outer leg by a bright portion, said inner leg defining an and a substantially cylindrical interior aperture of diameter d2 that is less than the substantially cylindrical exterior surface diameter d1 of the cable by an amount that is less than the amount of the diameter d3 of said lips exceeds the diameter d4 of said gland cavity, all defined as said split pressure balanced seal having an interference fit that is sufficiently greater at its radial exterior with the wall of said packing than the interference fit at its radial interior with the plastic covered cable to prevent gapping and leaking of the formed joint defined by said split pressure balanced seal such that the gland can be inserted within the gland cavity to press the pressure balanced seal against the spacer ring with sufficient force to effect sealing with even a single seal even though said seal is split.

10. The improved sealing combination of claim 9 wherein said split ring is formed of Buna-N (nitrite) Rubber having a durometer harness of about eighty (80) with a substantially square cross-sectional shape.

11. The sealing combination of claim 9 wherein said spacer ring is formed of a material selected from the group consisting of Nylon and Delrin.

12. The sealing combination of claim 9 wherein said pressure balanced seal is formed of synthetic rubber.

13. The sealing combination of claim 9 wherein said split ring is formed of Buna-N (nitrite) Rubber having a durometer hardness of about eighty (80); said spacer ring is formed of material selected from the group consisting of Nylon and Delrin; and said pressure balance seal is formed of synthetic rubber.

14. The sealing combination of claim 9 wherein said split pressure balance seal has no more than 0.005 inch (") interference fit with the plastic covered cable at its radial interior so as not to gap and leak; said split pressure balance seal has interference fit with the packing box at its radial exterior of less than 0.020 inch for sealing fit; and said pressure balanced seal has its ends where it is split cut in sealingly mating relationship at an angle alpha within the range of 5°-45° with respect to a plane perpendicular to the center line axis of said pressure balanced seal.

15. The sealing combination of claim 14 wherein said angle alpha is within the range of 20°-40° and said gland is moved 0.030 inch in compression of said sealing combination to effect sealing.

16. The sealing combination of claim 14 wherein said seal has a split backup compression ring disposed contiguous its top, on the side opposite said split spacer ring.

* * * * *